Figures 1, 2:
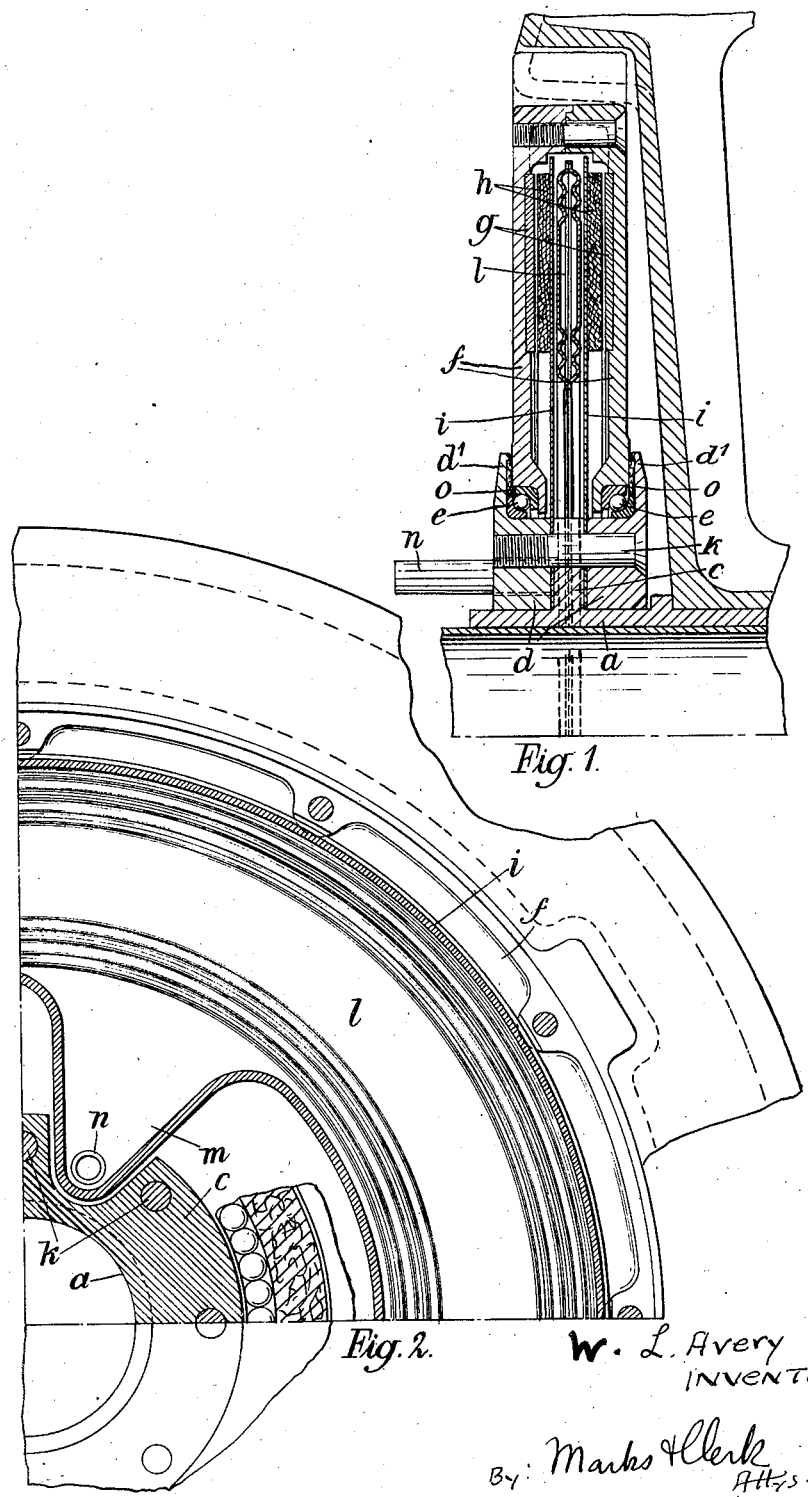

Jan. 21, 1936.　　W. L. AVERY　　2,028,488

BRAKE

Filed Nov. 2, 1932

W. L. Avery
INVENTOR

By Marks & Clerk
Attys.

Patented Jan. 21, 1936

2,028,488

UNITED STATES PATENT OFFICE 2,028,488

BRAKE

William Leicester Avery, Thorley, Bishop's Stortford, England

Application November 2, 1932, Serial No. 640,886
In Great Britain November 12, 1931

2 Claims. (Cl. 188—72)

This invention relates to brakes for automobiles and aeroplane landing wheels and is applicable to brakes generally and also to clutches, and the term "brake" when used herein is to be given a correspondingly broad interpretation.

The object of the present invention is to provide an improved construction of brake which may be simply manipulated and which will operate effeciently while at the same time being of an enclosed construction so as to be substantially dust- and dirt-proof.

The invention accordingly consists in a brake as described in the specification, claimed in the claims, and illustrated in the accompanying drawing in which Figure 1 is a cross sectional elevation showing one half of the brake, and Figure 2 is a side elevation, partly in section, of a part of the brake shown in Figure 1.

In carrying my invention into effect in one convenient manner as for example in its application to braking mechanism for the landing wheels of an aeroplane I form my improved brake with a central hub member $a$ adapted to be secured to some fixed part of the structure by means of a torque lever $b$ or otherwise and dimensioned if necessary to enable the spindle of the landing wheel to pass therethrough. The hub is formed with a centrally disposed radially projecting annular flange $c$ and upon either side of this flange I mount an annular ring or bearing flange $d$ adapted to engage the cylindrical hub portions. The bearing flanges are adapted to take ball bearings $e$ upon which I rotatably mount a casing $f$ which may be secured to the landing wheel by bolting through lugs or otherwise.

Upon the inner sides of this outer closed casing I arrange two annular steel liners $g$ adapted to co-operate with two annular brake members $h$ formed of any suitable friction material and each of which is carried upon a diaphragm or disc $i$, the inner edges of the diaphragms being disposed between the central flange upon the hub member and the bearing banges and the whole being clamped firmly in place by stays or bolts $k$ passing therethrough; one or more of said bolts may also be used for uniting the torque lever which may be fixed to part of the structure.

The brake members are adapted to be pressed into contact with their corresponding liners for the purpose of applying braking effort by any suitable mechanical, electrical or other means but preferably I employ fluid pressure means, for which purpose I dispose between the diaphragms or discs carrying the brake elements an expansible capsule or envelope $l$ of thin sheet steel or other suitable material which is generally of annular form to correspond with the form of the brake elements, but which annular part may have an inwardly projecting radial extension $m$ (Figure 2) to which may be secured an inlet pipe $n$ for a supply of pressure fluid, the central flange of the hub member being conveniently cut away to accommodate the end of the extension of the capsule, and the inlet pipe passing through one of the bearing members into the capsule extension.

It will be seen that with such a construction the brake may be readily applied while at the same time the operative parts are completely enclosed and are thus kept free from dust or dirt. The entry of foreign matter may be still further minimised by providing extension flanges $d'$, at the outer edges of the bearing rings or flanges $d$, between which extensions and the rotary casing I arrange suitable felt or other packing $o$.

It will be clear that the principles underlying the construction of brake mechanism will be equally applicable in the construction of clutches and the invention lends itself particularly to the production of a clutch mechanism, the fluid pressure for the operation of which may be supplied from the engine with which the clutch is associated.

The invention is not to be limited to the foregoing details of construction which are given purely by way of illustration since I may provide one or more brake elements each with its diaphragm or flexible carrying member in place of the duplicated arrangement hereinbefore described and may vary the means adopted for operating the braking elements whether by fluid pressure or by mechanical or electrical means depending upon the purpose for which the brake is to be employed or any practical requirements that may have to be fulfilled.

Having now described my invention, what I claim as new and desire to secure by Letters Patent is:—

1. A brake mechanism comprising in combination, a stationary hub having a radially projecting annular flange thereon, a pair of flexible annular metallic brake discs mounted at their inner peripheries upon the hub so that the flange thereon is disposed between the discs, a pair of annular clamping rings mounted upon the hub and adapted to clamp the inner peripheral surfaces of the discs against the said flange so that opposite surfaces of each disc are held by friction over a substantial area between the adjacent ring and the adjacent side wall of the flange, an expansible fluid capsule for actuating the brake discs, the capsule being mounted upon the hub and disposed between the discs, a hollow casing enclosing the discs and capsule and bearings rotatably supporting the casing upon the said rings, the annular side walls of the casing extending to the rings and being supported against lateral outward distortion at their inner peripheries by means of said bearings.

2. A brake mechanism comprising in combination, a stationary hub having a radially projecting annular flange thereon, a pair of flexible annular metallic brake discs free at their outer peripheries where braking engagement takes place and mounted at their inner peripheries upon the hub so that the flange on the latter is disposed between the discs, a pair of annular clamping rings mounted upon the hub one on each outer side of the discs and adapted to clamp the discs against the said flange so that each disc is held in position on the hub by friction extending over a substantial area of each side of each disc, an annular expansible capsule for actuating the brake discs, the capsule being disposed between the discs and having a radial extension projecting inwardly and communicating with a fluid pressure inlet which passes through one of the clamping rings and an aperture formed in the periphery of the said flange where the capsule is secured to the latter, a hollow casing enclosing the discs and capsule and having brake surfaces on the inside of its side walls for engagement by the brake discs and bearings rotatably supporting the casing upon said rings, the said casing having annular side walls which extend to the said rings and are supported at their inner peripheries upon said bearings so that the latter serve to support the side walls of the casing against lateral outward distortion in consequence of the forces imposed upon such side walls during braking.

WILLIAM LEICESTER AVERY.